United States Patent Office

3,728,104
Patented Apr. 17, 1973

3,728,104
COBALT RECOVERY
Thomas Hunter Coffield, Orchard Lake, Mich., assignor to Ethyl Corporation, Richmond, Va.
No Drawing. Filed Apr. 29, 1971, Ser. No. 138,757
Int. Cl. C22b 3/00
U.S. Cl. 75—101 BE                    18 Claims

ABSTRACT OF THE DISCLOSURE

A process for recovery of cobalt from a hydrometallurgical reaction mixture prepared in a process for winning cobalt and/or nickel by contacting the reaction mixture containing cobalt tetracarbonyl anion with a strong acid and decomposing the cobalt carbonyl hydride formed to cobalt carbonyl, separating the cobalt carbonyl from the acidified reaction mixture and thermally decomposing the cobalt carbonyl to metallic cobalt and recovering the metallic cobalt.

BACKGROUND OF THE INVENTION

Recovery of cobalt has long been dependent upon processing of other metals because of the natural occurrence of cobalt minerals with larger amounts of such metals as copper, nickel, iron, arsenic, manganese, silver, and the like. Consequently, the recovery of cobalt has suffered because of the requirements of processing and recovery of the more abundant and more widely used metals.

Cobalt presents a special problem when found in association with nickel. The two are physically and chemically similar, except that cobalt on being bombarded by neutrons produces a strong radioactive isotope—Cobalt 60—which has a half-life of about 5 years. For this reason cobalt can not be tolerated in nickel for producing steel used in nuclear reactors. Therefore, in nickel processing the goal is to produce as pure a product as possible. In the past this has been achieved with a resulting sacrifice in recovery of cobalt and nickel. In addition, previous processes have produced cobalt as either the carbonate or oxide.

Electrowinning techniques have been utilized predominantly to obtain pure cobalt in metallic form. However, except where a large copper or nickel electrowinning installation is also present, the recovery of cobalt by electrowinning is complex and expensive. Hydrometallurgical processes produce cobalt as an oxide or carbonate precipitated from aqueous solutions after extensive process purification and separation steps required for forming iron, copper- and nickel-free cobalt solutions. In the vapometallurgical process the use of high temperatures and elevated pressures to form liquid metal carbonyl mixtures requires subsequent separation of the nickel, cobalt, and iron carbonyls formed.

In U.S. 3,265,468 a process is described for forming dicobalt octacarbonyl from spent hydroformylation catalyst solution with an acid to form cobalt hydrocarbonyl which subsequently decomposes to dicobalt octacarbonyl. The object of this process is not the production of metallic cobalt but rather cobalt carbonyl which is recycled to the hydroformylation reaction.

It is an object of this invention to provide a convenient process for the recovery of cobalt. A further object is to provide a process which produces cobalt in the premium product form of high purity metallic cobalt. A further object is to provide a process which is adaptable to practice without respect to the source of ore so long as it contains recoverable quantities of cobalt. A still further object is to provide a process for producing cobalt as a by-product of processes for winning metals associated with cobalt which does not sacrifice cobalt recovery for recovery of such associated metals. Another object is to provide a process for recovery of cobalt by a combination hydrometallurgical-carbonyl process which is comparatively inexpensive and requires fewer operating steps to recover cobalt. Further objects will be apparent from the following description of the invention.

SUMMARY OF THE INVENTION

Accordingly, this invention provides a process for recovery of cobalt from a reaction mixture containing a cobalt tetracarbonyl anion, said process comprising acidification of the reaction mixture with a strong acid to form cobalt carbonyl, separating cobalt carbonyl from the reaction mixture, decomposing the cobalt carbonyl to metallic cobalt, and recovering metallic cobalt. In another aspect of the invention is provided a process for recovery of cobalt where the separation of cobalt carbonyl from the reaction mixture is carried out by solvent extraction in a water-immiscible solvent. A further aspect of the invention is a process for recovery of cobalt from an aqueous reaction mixture produced by the reductive carbonylation of an aqueous leach solution of a selectively reduced laterite ore. A still further aspect of the invention is a process for recovery of cobalt from cobalt carbonate precipitate collected on accumulation from several reductive carbonylation runs. This precipitate is dissolved and reductively carbonylated under conditions which maximize the production of cobalt tetracarbonyl anion, simultaneously separating nickel and copper impurities in the reaction mixture. Cobalt is recovered by acidification forming cobalt carbonyl which is separated by solvent extraction and decomposed to metallic cobalt.

DESCRIPTION OF PREFERRED EMBODIMENTS

As used in this description, the term "cobalt carbonyl" refers to $Co_2(CO)_8$. The term "Cobalt tetracarbonyl anion" refers to $Co(CO)_4^-$. The term "cobalt carbonyl hydride" refers to $HCo(CO)_4$. Also the term "reductive carbonylation" refers to a process (hereinafter more fully defined) in which a solution or slurry of reducible metal compounds, such as nickel, copper, and cobalt is contacted with a carbon monoxide-containing gas under conditions whereby the nickel is converted to nickel carbonyl; the cobalt is converted to cobalt tetracarbonyl anion; and the copper is converted to either copper metal, insoluble metal carbonate, or copper carbonyl complex; as such, the metals are easily separated and recovered.

One aspect of the invention is a process for the recovery of cobalt from an aqueous reaction mixture containing a cobalt tetracarbonyl anion, said process comprising (a) adding an acid to said reaction mixture,
(b) separating the cobalt carbonyl formed from said reaction mixture,
(c) decomposing said cobalt carbonyl to metallic cobalt, and
(d) recovering said metallic cobalt.

The aqueous reaction mixture composition is not critical except that it contains cobalt tetracarbonyl anion and no interfering metals, such as iron, which should be previously removed. The method of establishing such a reaction mixture is also not one of the critical spects of this invention. However, the combination of steps by which the reaction mixture is established is a specific embodiment hereof; e.g., a combined process for winning cobalt from a source of cobalt-containing ore and recovery of pure metallic cobalt. Such specific embodiments including treatment of the ore and establishing the reaction mixture when combined with the steps of acidification, separation of cobalt, and recovery will be more fully disclosed hereinafter. The cobalt tetracarbonyl anion in the aqueous reaction mixture is treated with acid at this point or any necessary adjustments may be made to the reaction mixture; for example, the volume of the reaction mixture may be decreased by evaporation, excess ammonia which may be carried through from previous processing steps, as will be discussed later, can be removed, or the pH adjusted for better control of process variables and for economy of reagents. Because of the effect of air or oxygen on the cobalt tetracarbonyl anion, it is preferred to carry out these operations under an inert or non-oxidizing atmosphere. Typical examples of suitable atmospheres are nitrogen, carbon monoxide, the inert gases and the like, although for economic reasons nitrogen or carbon monoxide is preferred.

According to the process of this invention, a strong acid is added to the aqueous reaction mixture containing cobalt tetracarbonyl anion. The only requirement of the added acid is that it be stronger than the cobalt carbonyl hydride. Typical of the acids which may be used are strong inorganic and strong organic acids. The strong inorganic or mineral acids may preferably be selected from hydrochloric, hydrobromic, sulfuric, sulfurous, and similar acids. Preferably, strong organic acids are selected from halogenated aliphatic carboxylic acids, such as trichloroacetic, trifluoroacetic, and similar acids.

The amount of acid required depends to a great extent on the reaction mixture and the amount of base and cobalt tetracarbonyl anion therein. A sufficient amount of acid is required to neutralize any base in the reaction mixture and to react with the cobalt tetracarbonyl anion. For convenience, it is preferable to have a slight excess of acid above that theoretically required. Using a slight excess maintains the equilibrium in a favorable direction and facilitates practical reaction rates. Thus, if the reaction mixture has no added base and is free of ammonia, a concentration of at least one equivalent of acid per mole of cobalt tetracarbonyl anion is required. Depending on the method of establishing the aqueous reaction mixture, it may contain from 2 to 16 moles of ammonia per mole of metal salt and a strong base in the amount of from 1 to 10 moles per mole of cobalt may have been added to stabilize the cobalt tetracarbonyl anion. Therefore, a preferable concentration of acid is from 2 to about 8 moles of said acid per mole of cobalt tetracarbonyl anion. A more preferred concentration of acid is about 2 to 4 moles of acid per mole of cobalt tetracarbonyl anion. The specific amount of acid is not critical but depends on the reaction mixture, and sufficient acid should be added to render the reaction mixture slightly acid.

On the addition of acid a number of reactions occur. Without being limited to any specific reaction scheme, it is probable that the release of a proton allows the formation of cobalt carbonyl hydride. This compound is not sufficiently stable in aqueous systems at the reaction temperatures to remain at any great concentration. Thus, it almost immediately and autogenously decomposes to form cobalt carbonyl and release hydrogen. Although the reaction could be retarded and the formation of cobalt carbonyl considerably slowed, it is convenient for the production of cobalt carbonyl to have the reactions take place in the reaction mixture. The decomposition of cobalt carbonyl hydride to cobalt carbonyl allows the equilibrium of the acidification reaction to shift in favor of the formation of more cobalt carbonyl hydride. While not being limited to any particular theory or reaction mechanism, it has been found that the addition of an acid to a reaction mixture containing cobalt tetracarbonyl anion under the conditions set forth hereinbelow produces cobalt carbonyl which may then be separated from the reaction mixture.

The separation may be carried out by any convenient means known in the art. The art has described several types of separation. According to one process the reaction mixture containing cobalt carbonyl can be extracted with a solvent for cobalt carbonyl and then the solvent can be removed, allowing recovery of the cobalt values. A convenient solvent for the extraction is any water-immiscible solvent so that a clean separation of the aqueous reaction mixture and the solvent is possible. Cobalt carbonyl is very soluble in normally liquid hydrocarbons. For economic reasons a preferred solvent is a hydrocarbon solvent having a boiling point from about 36 to about 200° C. More preferably, the hydrocarbon solvent is an aliphatic hydrocarbon selected from aliphatic hydrocarbon compounds having from 5 to 10 carbon atoms and mixtures of these; for example, pentane, hexane, heptane, octane, nonane, and decane are suitable aliphatic hydrocarbon compounds. Moreover, their branched chain derivatives are also suitable. In addition, mixtures of these aliphatic hydrocarbon compounds are suitable. A most preferred aliphatic hydrocarbon is heptane. Particularly useful are mixtures of aliphatic hydrocarbon compounds, such as paraffins. Typical paraffin fractions are ligroin, kerosene, gasoline, and the like.

The hydrocarbon solvent may also be selected from mononuclear aromatic compounds. For example, a preferred group of such aromatic compounds is selected from benzene, toluene, xylene, and their alkylated derivatives.

The cobalt carbonyl can be separated from the solvent and then decomposed to cobalt metal or the cobalt carbonyl can be decomposed in the solvent with evolution of CO, the cobalt remaining in suspension. In another aspect the cobalt-solvent solution can be flashed into a lower pressure-higher temperature vessel to volatilize the hydrocarbon solvent and effect decomposition of cobalt carbonyl simultaneously. Cobalt carbonyl decomposes at 52° C. under standard temperature and pressure conditions. Therefore, it is convenient to heat the solvent-cobalt carbonyl mixture to a temperature greater than 52° C. causing the decomposition of cobalt carbonyl. Temperatures up to about 300° C. can be employed.

The cobalt on decomposition to metallic cobalt in the solvent is suspended therein and can be recovered as such by any method known in the art. For example, a convenient means of recovery is to simply filter the solid from the solvent. In another method the solvent can be evaporated, for example in any convenient reaction vessel, such as an evaporator, and the solid metallic cobalt powder recovered while the solvent is condensed for reuse. The metallic cobalt produced in this process is of very high purity. The decomposition occurs cleanly without the formation of other crystalline cobalt compounds, such as the carbide. A major influence on the cobalt purity is the degree of efficiency of the separation between cobalt and nickel. By utilizing a process of reductive carbonylation, a very highly efficient method for separating the cobalt from nickel, as well as other metals has been demonstrated. The reductive carbonylation process is a most preferred process for establishing an aqueous reaction mixture and then recovering cobalt therefrom according to one aspect of this invention.

Reductive carbonylation is a process whereby an aqueous ammoniacal solution of reducible salts of nickel, copper, and cobalt are reacted with a carbon monoxide-containing gas at a pressure of from 100 to 1200 p.s.i.g. of CO and a temperature of from 100 to 400° C., optionally in the presence of a promoter for the formation of nickel carbonyl, such as cyanide anion. This reaction converts the above metal salts to nickel carbonyl, insoluble copper metal or carbonate depending on process conditions, and soluble cobalt tetracarbonyl anion or insoluble $CoCO_3$. Under alkaline conditions and in the presence of strong base, for example NaOH or KOH, the cobalt tetracarbonyl anion salt of cobalt tetracarbonyl hydride is stabilized and remains in solution. The nickel carbonyl is separated from the reaction mixture by sweeping out the volatile material with a non-reactive gas such as nitrogen or additional amounts of the carbon monoxide-containing gas, such as pure carbon monoxide or synthesis gas. Alternatively, the nickel carbonyl can be extracted from the aqueous reaction mixture with a water-immiscible hydrocarbon solvent. This should be separated from the aqueous reaction mixture prior to acidification to prevent extraction of the cobalt carbonyl formed along with the nickel carbonyl. The precipitate, containing copper and any residual material, and under the proper conditions basic cobalt carbonate, is separated from the reaction mixture by means known in the art such as filtration. When this reductive carbonylation process is combined with the recovery of cobalt according to this invention, a new process for recovery of cobalt results. In another aspect of this invention, the reductive carbonylation is carried out without the strong base; and cobalt carbonate precipitates out of the reaction mixture. This precipitate can be accumulated and later reductively carbonylated at conditions favorable for cobalt recovery.

A preferred embodiment of this invention is a process for the recovery of cobalt from an aqueous reaction mixture of a reducible cobalt compound, said process comprising contacting said reaction mixture with carbon monoxide at a temperature of from 100 to 400° C. and at a pressure of from 100 to 1200 p.s.i.g., whereby cobalt tetracarbonyl anion is formed in the reaction mixture, adding a strong inorganic acid to said reaction mixture, separating the cobalt carbonyl formed from the acidified reaction mixture, decomposing said cobalt carbonyl to metallic cobalt, and recovering said metallic cobalt.

In The Winning of Nickel, by Boldt, Jr., et al., D. Van Nostrand Co., New York, N.Y. (1967), pages 290–336 and 425–453, are described commercial processes for hydrometallurgical extraction of nickel and other metals such as cobalt from sulfide and oxide ores. These processes are suitable for establishing solutions or slurries suitable for reductive carbonylation. For example, one process which was commercially practiced to produce nickel and cobalt from a lateritic nickel ore employed the steps of crushing and grinding the ore, drying and sizing the ore particles for convenient processing, partially reducing the ore to the metals, cooling the reduced ore under non-oxidizing conditions, oxidatively leaching the reduced ore with aqueous ammonia and carbon dioxide to dissolve the nickel and cobalt as their carbonates, and then boiling the leach solution to concentrate the nickel and cobalt values which precipitate as the basic carbonates and recover ammonia and carbon dioxide values. According to the known process the nickel was then calcined to produce nickel oxide containing small amounts of cobalt oxide. Cobalt was minimized by conducting the reduction step selectively, but at the same time sacrificing some nickel. By using the process of this invention, the partial reduction step can be carried out under more stringent conditions to reduce substantially all of the cobalt and nickel to the metal form. Then these metals are leached and the leach solution is reductively carbonylated. The nickel carbonyl is separated from the reaction mixture, and the cobalt in the form of soluble cobalt tetracarbonyl anion can be acidified and the cobalt carbonyl formed separated from the reaction mixture and decomposed to metallic cobalt which is recovered.

As stated previously, cobalt and nickel are often found together in nickel, copper, iron and other ores. Thus, an especially useful and preferred process of this invention is one which separates cobalt from nickel and recovers cobalt in the same process. Such a preferred process is a process for the winning of cobalt from an ore containing recoverable quantities of nickel and cobalt, said process comprising:

(a) leaching said ore with an ammoniacal ammonium salt solution to establish a solution or slurry of reducible nickel and cobalt salts,
(b) reductively carbonylating said solution or slurry of reducible nickel and cobalt salts whereby nickel is converted to nickel carbonyl and cobalt is converted to cobalt tetracarbonyl anion,
(c) separating said nickel carbonyl from the reaction mixture,
(d) adding an acid to the reaction mixture, said acid being selected from the group consisting of a strong inorganic acid and a strong organic acid,
(e) separating the cobalt carbonyl formed from the acidified reaction mixture,
(f) decomposing said cobalt carbonyl to metallic cobalt, and
(g) recovering said metallic cobalt.

By the term "recoverable quantities" is meant any appreciable cobalt contained in the nickel ore source. For example, molar ratios of nickel to cobalt ranging from 100:1 to 1:1 are certainly typical of various sources of nickel and cobalt. Even larger ratios of nickel to cobalt can be useful in this process by precipitating the cobalt values as described above and building up cobalt in the aqueous reaction mixture or accumulated precipitate until it is economical to recover the cobalt. Sources of nickel such as ore, ore concentrate, ferronickel, furnace matte, smelter matte, converter matte, precipitate from a leach solution, the leach solution itself containing the metal values, sea nodules, scrap metal, and the like are suitable sources of nickel which contain recoverable quantities of cobalt. Both laterite and sulfide ores may also be sources of nickel containing recoverable quantities of cobalt. For economic reasons it is preferred to recover cobalt directly from nickel sources in which the nickel to cobalt molar ratio is not more than 10:1.

The source of cobalt does not have to contain nickel. For example, massive cobalt ores such as the cobaltiferous copper ore of Katanga can be a convenient source of cobalt. Appropriate pretreatment of the ore to establish a suitable reaction mixture is required. Further any ore containing the minerals carrollite, linnaeite, smaltite, skutterudite, cobaltite, asbolite, heterogenite, erythrite and the like may be useful sources of cobalt, with appropriate pretreatment, as known in the art, to establish a suitable reaction mixture. These minerals and others are generally found in chalcopyrite-cobaltite ores, copper-lead-cobalt-nickel sulfide ores, copper-cobalt-nickel sulfide ores, copper-cobalt oxidized and sulfide ores, silver-cobalt arsenide ores and the like.

This process for recovering cobalt is illustrated in the following examples. Except where indicated all parts are by weight.

Example 1

To a 300 milliliter reaction vessel equipped with a stirrer, vent and charge lines, heating means, and a thermocouple was added 1.59 parts of sodium carbonate, 1.59 parts of ammonium carbonate monohydrate, 13.38 parts of concentrated (30 weight percent) ammonium hydroxide, 50 parts of water, 2.8 parts by volume of 1 M potassium cyanide solution, and 4 parts of cobalt chloride hexahydrate. The addition was made under a nitrogen blanket. The reaction vessel was flushed out three times with 100 p.s.i.g. of carbon monoxide. It was then sealed and pressured to 50 p.s.i.g. with carbon monoxide and the stirrer was activated to dissolve the cobalt chloride in the solution. Heating was begun and the temperature was raised from room temperature to about 125° C. in 40 minutes. The carbon monoxide pressure was raised to 350 p.s.i.g. The reaction was allowed to proceed, and the reaction vessel was repressured to 350 p.s.i.g. after 105 minutes from the start of heating. Total reaction time was 5 hours and total pressure drop of CO was 140 p.s.i.g. The reaction mixture was cooled and allowed to stand overnight. The next morning the reaction vessel was vented and product was discharged into a reaction flask under nitrogen. The volume of product was increased to 250 parts by volume with water and divided into 10 aliquots of 25 parts by volume each for later use.

The reaction was quantitative as evidenced by the absence of solids in the reaction vessel. Based on the starting amount of cobalt (4 parts cobalt chloride hexahydrate) the product contained approximately 1 part of cobalt in the form of cobalt tetracarbonyl anion or about 0.1 part of cobalt in each aliquot taken.

Example 2

An aliquot of the product from Example 1 containing approximately 0.1 part of cobalt in the form of cobalt tetracarbonyl anion was boiled under nitrogen for about 30 minutes. After cooling to room temperature the colorless solution was filtered under nitrogen to remove a small amount of solid which had formed. To the clear filtrate was added 13.68 parts of heptane and a total of 4.24 parts of concentrated (36 weight percent) HCl. During addition the contents of the reaction flask were vigorously stirred, and a nitrogen sweep was employed to carry volatile products from the reaction flask into a bromine trap. The HCl addition was complete in 5 minutes, and total reaction time was about 15 minutes. The heptane layer was orange-yellow and turned dark brown on completion of the reaction. The heptane layer was separated from the aqueous layer and the aqueous layer was washed with additional heptane and transferred to a reaction flask with the bromine trap contents. The excess bromine in the trap was taken up with hexene-1. The flask containing the organic layer was water extracted to obtain cobalt bromide for analysis. The cobalt bromide reported as 0.085 part of cobalt on analysis by spectrophotometry using a ferrocyanide-acetone complex. The same method was used to analyze the acidified reaction product for cobalt and only 0.005 part of cobalt was found. This indicates that 85 percent of the cobalt was recovered as cobalt carbonyl, $Co_2(CO)_8$, which was extracted in the heptane.

Example 3

A cobalt carbonyl-heptane solution prepared in a manner similar to the process of Examples 1 and 2, except the heptane layer was not reacted with bromine, and containing about 0.064 part of cobalt was added dropwise from a dropping vessel to an Erlenmeyer flask submerged in a silicon oil bath heated to 160° C. The flask was stoppered and flushed with nitrogen into bromine traps. As the drop impinged in the bottom of the flask, the heptane was volatilized out and the cobalt carbonyl decomposed coating the bottom of the flask with a black solid. Addition of the cobalt carbonyl solution was complete after 10 minutes, and the flask was heated for an additional 20 minutes. At this time the flask was removed and cooled to room temperature. About 0.01 part of the black solid was removed from the flask for X-ray diffraction analysis whish showed the solid to be a mixture of hexagonal and cubic cobalt. The remainder of the black solid was dissolved in concentrated (30 weight percent) HCl and reacted with thiocyanate which showed on spectrophotometric analysis to contain 0.026 part of cobalt. The remaining cobalt reported as cobalt bromide from the nitrogen sweep into a bromine trap. About 0.022 part of cobalt was shown by spectrophotometric analysis to be contained in the bromine trap. Accordingly, a yield of about 40 percent of the metallic cobalt was obtained with no impurities detected in the metallic cobalt.

Example 4

A reaction mixture containing 0.01 gram per liter of cobalt tetracarbonyl anion is treated according to the process of Examples 2–3 and a satisfactory yield of metallic cobalt being obtained.

Similar results are achieved in treating reaction mixtures having up to about 250 grams per liter of cobalt as the cobalt tetracarbonyl anion. Thus, a typical reaction mixture which is suitable for this process can have concentrations of cobalt tetracarbonyl anion ranging from 0.01 to about 250 grams per liter. It should be understood that practical considerations of processing will set the optimum range of the cobalt concentration.

Example 5

The process of Examples 1–3 is repeated except that the extraction solvent used is toluene with good yields of metallic cobalt are obtained.

In the above example similar results are obtained by using pentane, hexane, octane, nonane, decane, benzene, naphthalene, and like hydrocarbon solvents having a boiling point in the range of from 36° to 200° C. Similarly mixed paraffins such as kerosene, gasoline, ligroin, and the like may be used.

Example 6

The process of Examples 1–3 is repeated except that the acid used is replaced with sulfuric acid and similar results in the recovery of cobalt are obtained.

Typical of other acids which may be used with similar results are hydrobromic, hydrofluoric, sulfurous, and other acids having a dissociation constant greater than that required to replaced the alkali metal on the cobalt tetracarbonyl anion, or a dissociation constant greater than $10^{-2}$. Similarly strong organic acids may be used such as trichloroacetic acid, trifluoroacetic acid, and other halogenated carboxylic acids similar to those just named.

Example 7

A cut of a laterite ore body is mixed with similar cuts of the ore body by clamshell bucket cranes to prepare a feed of reasonably uniform composition. The mixed feed is size-reduced in toothed roll crushers to break up large lumps of ore and then dried in a concurrently oil-fired rotary drying kiln. The dried ore averages the following composition:

| | Percent |
|---|---|
| Nickel | 1.5 |
| Cobalt | 0.1 |
| Iron | 38.0 |
| Magnesia | 8.0 |
| Silica | 14.0 |

The dried ore is then finely ground in hammer and ball mills to about 90 percent 200-mesh before reduction. The ore is then reduced in a multiple hearth furnace with producer gas from anthracite coal. Additional heat from combustion of heavy fuel oil is added as required. A strong reducing atmosphere is maintained by burning the coal or fuel oil at 50 percent of the theoretical air requirements. The ore is fed into the top of the furnace and producer gas enters at the bottom. The reduction of nickel and cobalt metal is completed before the temperature reaches 1400° F. The residence time in the furnace is about 90 minutes and reduced nickel and cobalt is discharged as an iron-nickel-cobalt alloy into cooling tubes. The cooling tubes are maintained in a non-oxidizing atmosphere to prevent re-oxidation of nickel. The alloy and ore is discharged from the cooling tubes at 300° F. into quench tanks containing pre-cooled leach liquor. The quenched solution is 6.5 percent $NH_3$, 3.5 percent $CO_2$, 1 percent Ni, and about 0.04 percent CO, and is adjusted to maintain a pulp density of about 20 percent solids. The slurry is passed into aerating tanks and oxygenated by air. Nickel and cobalt are dissolved into the solution and iron converts to ferric oxide. The nickel and cobalt are combined with ammonia in the ammonia-ammonium carbonate leach liquor forming the stable hexamine complex $Ni(NH_3)_6^{++}$ and $Co(NH_3)_6^{++}$. The aeration tank discharge is thickened and product liquor containing the dissolved nickel is sent to steam stripping. The residue is washed by counter-current decantation in a 14 percent $NH_3$, 8.5 percent $CO_2$ solution to recover any nickel values. The residual slurry is steam stripped to recover ammonia and carbon monoxide values. The product liquor from the thickener is a nickel- and cobalt-enriched ammoniacal ammonium carbonate solution. Traces of iron and ore fines are removed by agitation with air in an aerating unit. A filter aid such as diatomaceous earth is added and the solution is filtered.

The clarified product liquor is charged to a pressure reaction vessel and sufficient sodium carbonate is added to provide a molar ratio of 2:1 moles of sodium carbonate per mole of cobalt. Potassium cyanide, in an amount sufficient to provide a molar ratio of 19:1 moles of nickel to potassium cyanide, as a catalyst is added. The reactor is pressured with carbon monoxide and heated to 125° C. producing $Ni(CO)_4$ and $Co(CO)_4$. The vapors are vented to a thermal decomposition zone and the nickel carbonyl is decomposed to produce carbon monoxide and metallic nickel powder. Additional carbon monoxide is passed through the reactor to sweep out any remaining nickel carbonyl product. This is also decomposed to produce additional nickel. Care should be taken to avoid exposure to nickel carbonyl which is very toxic. The aqueous reaction mixture is then acidified with HCl and the cobalt carbonyl formed is extracted with heptane. The heptane is stripped off and the cobalt carbonyl is thermally decomposed to cobalt metal.

The metallic cobalt is recovered in the form of metallic cobalt powder. As such, it is a useful product in the metal industry. Also, according to known methods it can be agglomerated and sintered to pellets or briquettes and sold as such. These latter forms are sometimes preferred because of their easier handling properties.

Cobalt metal has ready application in the metals industry to the production of high-temperature alloys, magnetic alloys, hard facing and wear resistant alloys, cemented carbides and other metallic uses. End uses are in magnet steels for both permanent and soft magnets; alnicos, composed of aluminum, nickel and cobalt, for use as industrial permanent magnets; high-temperature alloys useful above 1000° F. and superalloys used nearer the alloy melting temperatures but generally below 2200° F., such as cobalt-base alloys in which cobalt is the major constituent and nickel- and iron-base alloys in which cobalt may be used at levels of 10 to 20 percent; and in dental prosthesis and surgical alloys, such as the Co-Cu-base alloy, Vitallium. The cobalt alloys having low expansion are useful in precision instruments, clocks and watches for hair springs and balance wheels. High electrical resistant alloys use cobalt as an alloying element in tube-filament alloys and for electrical furnaces. Aerospace applications of cobalt alloys are for high-temperature bearing surfaces which have good lubricating characteristics because of the CoO formed on surface oxidation.

Further, cobalt has use outside the metals industry as salts, frits, pigments and other non-metallic uses.

The above description is illustrative and the invention is intended to be limited only by the lawful scope of the following claims.

I claim:

1. A process for recovery of cobalt from an aqueous reaction mixture containing cobalt tetracarbonyl anion, said reaction mixture being formed from a solution or slurry containing a reducible cobalt compound and additionally containing a reducible copper or nickel compound, or both, said process comprising the steps of
    (a) adding an acid to said reaction mixture,
    (b) extracting the cobalt carbonyl formed from said reaction mixture with a water-immiscible solvent,
    (c) decomposing said cobalt carbonyl to metallic cobalt, and
    (d) recovering said metallic cobalt.

2. A process of claim 1 wherein said cobalt tetracarbonyl anion is present at from 0.01 to about 250 grams per liter of said aqueous reaction mixture.

3. A process of claim 1 wherein said acid is selected from the group consisting of a strong inorganic acid and a strong organic acid.

4. A process of claim 3 wherein said acid is a strong inorganic acid.

5. A process of claim 4 wherein said strong inorganic acid is selected from the group consisting of sulfuric acid, sulfurous acid, hydrochloric acid, and hydrobromic acid.

6. A process of claim 4 wherein said strong inorganic acid is sulfuric acid.

7. A process of claim 4 wherein said strong inorganic acid is hydrochloric acid.

8. A process of claim 3 wherein said organic acid is a halogenated aliphatic carboxylic acid selected from the group consisting of trichloroacetic acid and trifluoroacetic acid.

9. A process of claim 1 wherein said solvent is a hydrocarbon solvent having a boiling point from about 36° to about 200° C.

10. A process of claim 9 wherein said hydrocarbon solvent is an aliphatic hydrocarbon selected from aliphatic hydrocarbon compounds having from 5 to 10 carbon atoms and mixtures of these.

11. A process of claim 10 wherein said aliphatic hydrocarbon is heptane.

12. A process of claim 9 wherein said hydrocarbon solvent is a mononuclear aromatic hydrocarbon compound.

13. A process of claim 12 wherein said hydrocarbon solvent is selected from the group consisting of benzene, toluene, xylene, and their alkylated derivatives.

14. A process of claim 1 wherein said step (c) is further characterized by heating said cobalt carbonyl to effect decomposition and produce metallic cobalt.

15. A process of claim 1 wherein said acid is selected from the group consisting of a strong organic acid and a strong inorganic acid and said step (c) is further characterized by heating said cobalt carbonyl to effect decomposition and produce metallic cobalt.

16. A process of claim 1 wherein said acid is a strong inorganic acid and wherein said solvent is a hydrocarbon solvent having a boiling point from about 36° to about 200° C.

17. A process for the recovery of cobalt from an aqueous reaction mixture of a reducible cobalt compound, said process comprising contacting said reaction mixture with carbon monoxide at a temperature of from 100 to 400° C. and at a pressure of from 100 to 1200 p.s.i.g., whereby cobalt tetracarbonyl anion is formed in the reaction mixture, adding a strong inorganic acid to said reaction mixture, extracting the cobalt carbonyl formed from the acidified reaction mixture with a water-immiscible solvent, decomposing said cobalt carbonyl to metallic cobalt, and recovering said metallic cobalt.

18. A process of winning cobalt from an ore containing recoverable quantities of nickel and cobalt, said process comprising:
    (a) leaching said ore with an ammoniacal ammonium salt solution to establish a solution or slurry of reducible nickel and cobalt salts,
    (b) reductively carbonylating said solution or slurry of reducible nickel and cobalt salts whereby nickel is converted to nickel carbonyl and cobalt is converted to cobalt tetracarbonyl anion,
    (c) separating said nickel carbonyl from the reaction mixture,
    (d) adding an acid to the reaction mixture, said acid being selected from the group consisting of a strong inorganic acid and a strong organic acid,
    (e) extracting the cobalt carbonyl formed from the acidified reaction mixture with a water-immiscible solvent, (f) decomposing said cobalt carbonyl to metallic cobalt, and
(g) recovering said metallic cobalt.

References Cited

UNITED STATES PATENTS

| | | | |
|---|---|---|---|
| 3,265,468 | 8/1966 | Farkas et al. | 23—203 C |
| 1,686,391 | 10/1928 | Muller et al. | 75—103 X |
| 3,236,597 | 2/1966 | Knap | 23—203 C |
| 3,252,791 | 5/1966 | Frysinger et al. | 75—119 |

OTHER REFERENCES

Young, "Cobalt," Reinhold Publishing Corp., N.Y., 1960, p. 75.

HERBERT T. CARTER, Primary Examiner

U.S. Cl. X.R.

75—103, 119; 423—417